July 20, 1965  J. C. HOUDA, JR  3,195,589
CONTINUOUS-FLOW FILLING APPARATUS
Filed Feb. 1, 1963  2 Sheets-Sheet 1
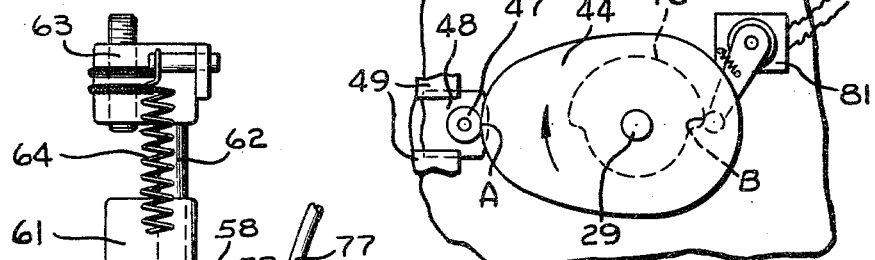
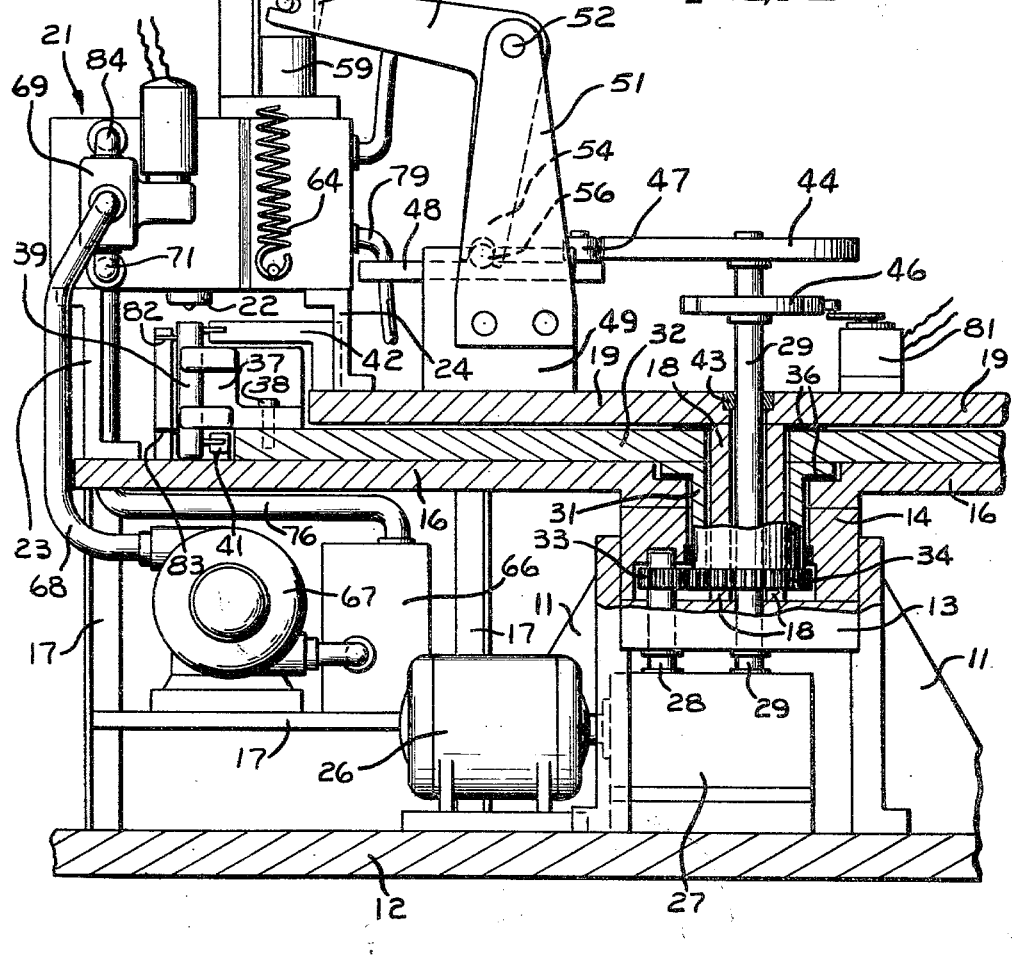
INVENTOR
J.C. HOUDA, JR.
BY A.C. Schwary jr.
ATTORNEY

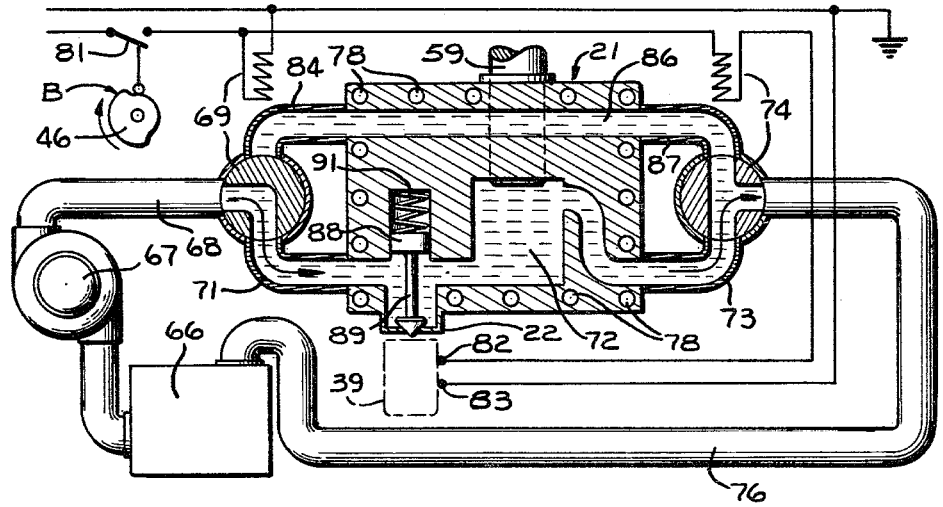
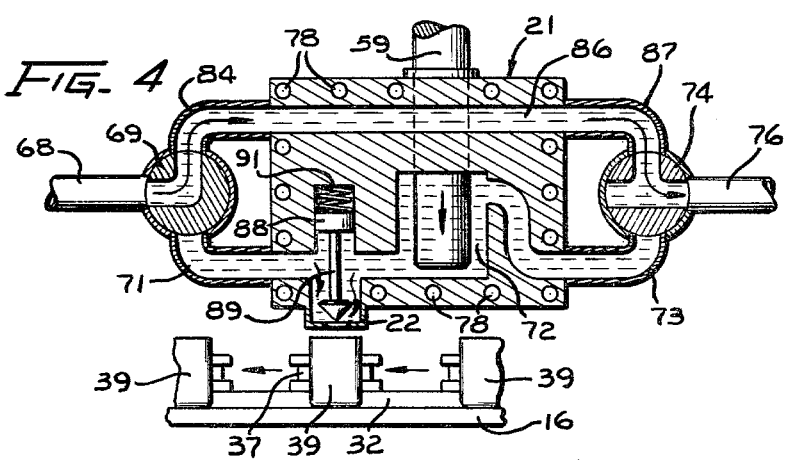
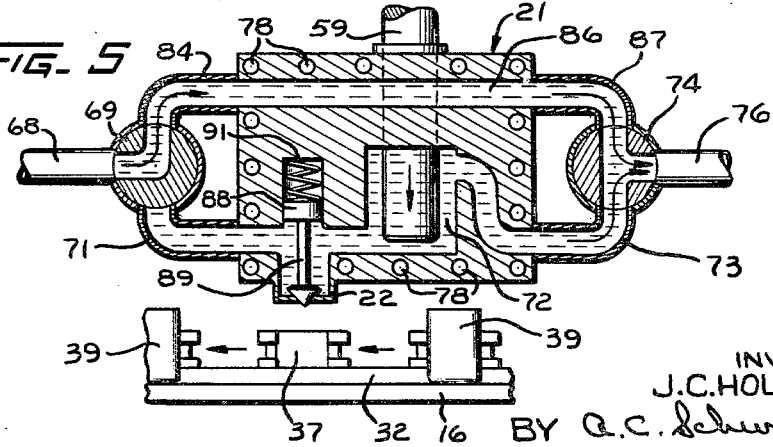

3,195,589
CONTINUOUS-FLOW FILLING APPARATUS
James C. Houda, Jr., Downers Grove, Ill., assignor to Western Electric Company, Incorporated, New York, N.Y., a corporation of New York
Filed Feb. 1, 1963, Ser. No. 256,207
9 Claims. (Cl. 141—131)

This invention relates to a dispensing apparatus, and more particularly to a dispensing apparatus for dispensing a constant volume charge of liquid from a system in which it is desired that the liquid be in continuous circulation. It is an object of this invention to provide an improved apparatus of such a character.

Two general approaches have been taken in past apparatus designed for dispensing a liquid which is circulated through a conditioning system such that the liquid is at a proper temperature and condition for use after being dispensed.

A first approach has been to dispense the liquid directly from the conditioning system through which it is being circulated. The trouble found in this approach is that the pressure and amount of material within the conditioning system varies from moment to moment and difficulty is experienced in trying to dispense automatically an exact charge of liquid.

A second approach has been to use two independent holding tanks in conjunction with a single conditioning system. In this case the liquid from one holding tank is circulated through the conditioning system in order to bring it to a proper temperature and condition for dispensing, while the liquid in a second holding tank is being dispensed. As successive charges of the liquid are dispensed from the second holding tank, the liquid remaining in that tank changes its physical characteristics, for example, temperature over a range of values before the contents of that tank are circulated through the conditioning system. When the contents of the second tank are circulating through the conditioning system, the liquid from the first holding tank is dispensed.

The present invention provides apparatus for continuously circulating a liquid alternatively through one of two parallel flow paths, both paths being housed within a conditioning environment such that the liquid circulating through them is in a proper condition for dispensing. One of the paths constitutes a primary flow path which also defines a housing for a constant volume dispenser and the liquid normally flows through this primary path in order to insure that the dispenser housing is filled with liquid. Valves permit the simultaneous closing of the primary flow path and the diversion of the flowing liquid to the alternate flow path which is in parallel with the primary flow path. When the primary flow path is closed off, the dispenser is actuated to dispense a predetermined charge of liquid. Thus, the primary flow path which defines the dispenser housing is independent of the recirculating system when the dispenser is in a dispensing condition, but the primary flow path cooperates with the recirculating system to refill the dispenser housing when the dispenser is in a non-dispensing condition. The liquid is kept continuously at the predetermined condition by circulating it alternatively through one of the two parallel flow paths which are housed within the conditioning environment.

It is another object of this invention to provide apparatus which dispenses successive predetermined charges of a continuously circulating liquid.

It is still another object of the invention to provide apparatus which dispenses successive predetermined charges of a liquid from a primary flow path, the primary flow path defining a closed housing for a constant volume dispenser when the dispenser is in a dispensing condition.

It is a further object of this invention to provide apparatus which dispenses successive predetermined charges of a liquid from a primary flow path which defines a closed housing for a constant volume dispenser while an alternate flow path in parallel with the primary flow path carries the continuously circulating liquid.

It is a still further object of the invention to provide apparatus which dispenses a predetermined charge of liquid from a primary flow path, the primary flow path defining a closed housing for a constant volume dispenser only when a receptacle is properly positioned to receive the discharged liquid.

In accordance with the invention, dispensing apparatus is provided with a primary and an alternate flow path, the paths being housed in a conditioning environment. The primary flow path defines the housing of a constant volume dispenser. When the dispenser is not in a dispensing condition, the liquid flows through the primary flow path, thereby filling the dispenser housing. However, when the dispenser is in a dispensing condition, the primary flow path is closed off to form a closed dispenser housing and the liquid circulates through the alternate flow path.

Preferably, the primary flow path is completely closed off during the dispensing operation only when a receptacle is properly positioned to receive the discharged liquid.

This invention together with further objects and advantages thereof will best be understood by reference to the following description taken in conjunction with the accompanying drawings, in which:

FIG. 1 is a side elevation, portions of which are in cross-section, of one embodiment of the apparatus of the invention;

FIG. 2 is a fragmentary plan view of the cam control mechanism used in conjunction with the invention;

FIG. 3 is a diagrammatical, partially cross-sectional, view of a portion of the apparatus of the invention which shows both an embodiment of the circuitry necessary for control of the apparatus, and also depicts the valving arrangement for permitting a liquid to flow through a primary flow path;

FIG. 4 is a diagrammatical, partially cross-sectional view of a portion of the apparatus of the invention depicting the valving arrangement for allowing a liquid to flow through an alternate flow path, while the primary flow path has been closed off to form the housing of a constant volume dispenser; and FIG. 5 is a diagrammatical, partially cross-sectional, view of the apparatus of the invention depicting the valving arrangement when a receptacle is not present to receive the dispensed liquid.

In FIG. 1 one embodiment is shown of an apparatus for dispensing successive predetermined portions of a liquid from a system in which the liquid is in continuous circulation. In this particular embodiment the liquid being dispensed is a mixture of 92.5% polyethylene and 7.5% of polybutene filler. This liquid must be continuously recirculated through a heated environment both to prevent its separation into layers and to keep it at a temperature of approximately 240° F., thereby insuring that the liquid has the proper fluidity for dispensing.

Frame members 11 (FIG. 1) secured to a base plate 12, support frame members 13 and 14. A lower stationary tooling plate 16 is secured to the frame member 14 and supported by additional frame members 17. A hollow sleeve 18 is secured to the frame member 13 and supports an upper stationary tooling plate 19.

A dispensing device generally designated by the numeral 21, having an outlet nozzle 22, is mounted above the spaced tooling plates 16 and 19 by bracket members 23 and 24 respectively.

A suitable motor 26, mounted on the base plate 12, drives a gear box 27 which transmits power to output shafts 28 and 29, the shaft 28 being rotated intermittently and the shaft 29 continuously.

A hollow sleeve 31, which encircles the sleeve 18, supports a table 32 for intermittent rotary movement. The output shaft 28 intermittently drives the table 32 through a gear 33 secured to the shaft 28, and a gear 34 secured to the lower portion of the sleeve 31.

The table 32, which moves between the spaced tooling plates 16 and 19 on bearings 36, carries suitable receptacle holders 37 secured to it by bolts 38. When the table 32 has been indexed to a position such that a metal receptacle 39, carried by the receptacle holder 37, is directly beneath the nozzle 22, movement of the table 32 is terminated. Two receptacle positioning members 41 and 42, secured to the tooling plates 16 and 19, respectively, cooperate with the receptacle holder 37 to orientate properly the receptacle 39 with respect to the nozzle 22.

The continuously drive shaft 29, which passes up through the hollow sleeve 18 and a bearing surface 43 on the tooling plate 19, carries two operating cams 44 and 46. A cam follower 47, which is secured to a slide plate 48, abuts the cam 44. A slide block 49, which is secured to the tooling plate 19 and in which the slide plate 48 reciprocates, carries a pair of spaced frame members 51 which support a pivot pin 52. A bell crank lever 53, which is pivoted about the pin 52, has both a lower bifurcated portion 54 which overlies a pin 56 suitably secured to the slide plate 48, and an upper bifurcated portion 57 which overlies a pin 58 suitably secured to a plunger 59.

A frame member 61, which is secured to the dispenser 21, guides an upper portion 62 of the plunger 59. An adjustable stop device 63 carried by the upper portion of the plunger limits the downward movement of the plunger by abutting the member 61.

A pair of springs 64, alternatively secured at one end to the dispenser 21 and at the other end to the adjustable stop device 63, normally bias the bell crank lever 53 counterclockwise around the pivot pin 52.

Operation of the dispensing device may be best understood by reference to FIG. 3, which shows the dispenser 21 in a condition just prior to the time when the cam 44 has reached a position as depicted in FIG. 2, wherein the apex A of the cam 44 is abutting the cam follower 47.

A liquid, which is drawn from a holding tank 66 by a pump 67, is fed by a line 68 to an inlet solenoid-operated valve 69, the valve 69 having an L shaped bore in its valve body. The liquid then flows through a line 71, a body cavity 72 in the dispenser 21, a line 73, and an outlet solenoid-operated valve 74, the valve 74 having a T shaped bore in its valve body. The flow path thus established, from the inlet valve 69 to the outlet valve 74, constitutes the primary flow path which defines the housing of a constant volume dispensing device. The liquid is returned to the holding tank 66 by a return line 76.

The liquid flowing through the dispenser 21 is kept at the proper temperature by feeding high pressure steam from a steam line 77 (FIG. 1) to steam ports 78 (FIG. 3) and removing the condensate by a line 79 (FIG. 1).

During the time that the liquid is flowing through the primary flow path, the shaft 28 is driven to index the table 32 and thereby position an empty receptacle 39 under the nozzle 22. However, when the continuously driven shaft 29 rotates the cams 44 and 46 to the position as depicted in FIG. 2, rotation of the table 32 is terminated.

As also depicted in FIG. 2, the high portion B of the cam 46 will actuate a spring-biased microswitch 81. The microswitch, which is mounted on the upper tooling plate 19, controls the circuit to the solenoids of the solenoid valves 69 and 74. The closing of the microswitch 81 always energizes the solenoid of the valve 69. However, the solenoid of valve 74 will be energized only if a circuit is completed through the metal receptacle 39 by a pair of receptacle sensing electrodes 82 and 83, which are electrically connected in series with the solenoid of the valve 74.

The electrodes 82 and 83 are mounted above the tooling plate 16 so that they aid in proper positioning of the receptacle 39. If the receptacle is properly positioned under the nozzle 22 when the cam 46 actuates the microswitch 81, the valves 69 and 74 will both be turned to the position shown in FIG. 4.

In this position the flow of liquid from the inlet valve 69 is diverted through a line 84, a bore 86, a line 87 and the outlet valve 74. The flow path thus established from inlet valve 69 to outlet valve 74 constitutes the alternate flow path.

With the valves 69 and 74 so positioned the primary flow path is blocked off to form a closed dispenser housing for the dispensing device 21.

As the cam 44 is rotated through the next 180° from the position depicted in FIG. 2, the plunger 59 will be drawn into the body cavity 72 of the dispenser 21 by the force of springs 64. Downward movement of the plunger 59 pivots the bell crank lever 53 counterclockwise about the pivot pin 52, thereby keeping the cam follower 47 in abutment with cam 44 and limiting the rate of descent of the plunger 59.

Advancement of the plunger 59 into the body cavity 72, increases the pressure in the primary flow path until a piston end 88 of a needle point valve 89 is moved upwardly against a spring 91. The needle valve 89, thus lifted from its normal position, opens the nozzle 22 allowing the liquid to flow into the receptacle 39. The liquid issues forth from the nozzle until the stop device 63 abuts the guide member 61. Since the pressure in the primary flow path is no longer increased by downward movement of the plunger 59, but instead is decreased as the liquid flows from the nozzle, the biased needle valve 89 will return to its normal position to close off the flow.

Because the body cavity 72 of the dispensing device 21 is completely filled at the time the plunger 59 is moved downwardly, an exact charge of liquid is always dispensed. The volume of the charge may be controlled by prepositioning the stop device 63. Prepositioning of the stop device 63 will limit the pivotal movement of the bell crank lever 53 around the pivot 52. This will mean that the cam follower 47 will abut the cam 44 only during those times in which the plunger is being moved into or retracted from the body cavity 72.

By the time the plunger 59 has reached the end of its downward travel, and the liquid has been discharged from the dispenser 21, the cams 44 and 46 have been rotated through an angle of 180° from the position shown in FIG. 2. During the next 180° of rotation of the cams 44 and 46, the microswitch 81 will be open and the solenoid valves 69 and 74 will be spring returned to the condition shown in FIG. 3. During this portion of rotation of the cams 44 and 46 the liquid will flow through the primary flow path to refill the body cavity 72, and the plunger 59 will be withdrawn from the body cavity 72 by the action of the cam 44 in moving the bell crank lever 53 in a clockwise manner about the pivot pin 52. The table 32 will also be indexed to position an empty receptacle under the nozzle 22.

When the cams 44 and 46 have been rotated through a full 360° the aforegoing cycle is repeated each time a receptacle 39 is properly positioned beneath the nozzle 22. However, if the electrodes 82 and 83 (FIG. 3) do not complete a circuit through a receptacle 39 when the microswitch 81 is closed, as for example, when a receptacle is missing, the dispenser achieves a condition as depicted in FIG. 5.

The valve 69 is repositioned such that the liquid flows through the alternate flow path. However, the coil of the solenoid valve 74 which is in series with the electrodes 82 and 83, is not actuated as the circuit to it is open, and the valve 74 remains in its original position. When the plunger 59 moves downwardly into the body cavity 72, the liquid in the primary flow path is discharged through the valve 74 into the line 76 as the pressure increase in the primary flow path is not great enough to overcome the force of spring 91.

The present invention discloses apparatus for dispensing successive predetermined charges of a portion of a liquid which is continuously circulating through a conditioning environment. A portion of the liquid is dispensed from a primary flow path which defines the housing of a constant volume dispenser, while the rest of the liquid is being recirculated through an alternate flow path. The primary flow path defines a closed dispenser housing only when a receptacle is properly positioned to receive the discharged liquid.

While an embodiment of the invention has been disclosed, many modifications will be apparent. For example, the valves used in interconnecting the primary and alternate flow paths may be hand-operated. Also, the plunger of the dispensing device may be controlled by a solenoid. It is intended that the invention be interpreted as including all modifications which fall within the true spirit and scope thereof.

What is claimed is:

1. In apparatus for dispensing a constant volume charge of liquid from a system in which it is desired that the liquid be in continuous circulation:
   means defining a primary flow path through which the liquid normally flows, said means comprising the housing of a constant volume dispensing device;
   means defining an alternate flow path in parallel with the primary flow path;
   valve means for closing off the ends of the primary flow path and for diverting the liquid through the alternate flow path so that said means defining the primary flow path may serve as a closed dispenser housing during a dispensing operation; and
   means for causing dispensing of the liquid from the primary flow path when the ends thereof are closed off.

2. In apparatus for dispensing a constant volume charge of liquid from a system in which it is desired that the liquid be in continuous circulation:
   means defining a primary flow path through which the liquid normally flows, said means comprising the housing of a constant volume dispensing device;
   dispensing means cooperating with said path defining means to form a constant volume dispensing device;
   means defining an alternate flow path in parallel with the primary flow path;
   valve means for closing off the ends of the primary flow path and for diverting the liquid through the alternate flow path so that said means defining the primary flow path may serve as a closed dispenser housing during a dispensing operation; and
   means for actuating said dispensing means to dispense a charge of liquid from the primary flow path when the ends thereof are closed off.

3. In apparatus for dispensing a constant volume charge of liquid from a system in which it is desired that the liquid be in continuous circulation:
   means defining a primary flow path through which the liquid normally flows, said means comprising the housing of a constant volume dispensing device;
   means defining an alternate flow path in parallel with the primary flow path;
   valve means for closing off the ends of the primary flow path and for diverting the liquid through the alternate flow path so that said means defining the primary flow path may serve as a closed dispenser housing during a dispensing operation;
   a dispensing valve housed within said primary flow path, said dispensing valve being operable to dispense the liquid from the primary flow path when ends thereof are closed off and the pressure therein exceeds a predetermined amount;
   pressure increasing means cooperable with the primary flow path to increase the pressure therein beyond a predetermined amount only when the ends thereof are closed off so that said dispensing valve is operable to dispense a charge of liquid from the primary flow path; and
   means for actuating said pressure increasing means to dispense a charge of liquid from the primary flow path when the ends thereof are closed off.

4. In apparatus for dispensing a constant volume charge of liquid from a system in which it is desired that the liquid be in continuous circulation:
   means defining a primary flow path through which the liquid normally flows, said means comprising the housing of a constant volume dispensing device;
   dispensing means cooperating with said path defining means to form a constant volume dispensing device;
   means defining an alternate flow path in parallel with the primary flow path;
   valve means for selectively permitting flow of the liquid alternatively through the primary flow path and the alternate flow path, said valve means normally in a condition such that the liquid flows through the primary flow path; and
      control means:
         both for actuating said valve means to divert all the flowing liquid through the alternate flow path and to close off the ends of the primary flow path such that said primary path defining means serves as a closed dispenser housing during a dispensing operation; and
         for actuating said dispensing means to dispense a charge of liquid from the primary flow path when the ends thereof are closed off.

5. In apparatus for dispensing into a receptacle a constant volume charge of liquid from a system in which it is desired that the liquid be in continuous circulation:
   means defining a primary flow path through which the liquid normally flows, said means comprising the housing of a constant volume dispensing device;
   dispensing means cooperating with said path defining means to form a constant volume dispensing device;
   means defining an alternate flow path in parallel with the primary flow path;
   valve means for selectively permitting flow of the liquid alternatively through the primary flow path and the alternate flow path, said valve means being normally in a condition such that the liquid flows through the primary flow path; and
   control means operable when a receptacle is properly positioned to receive the dispensed liquid both:
      to actuate said valve means to divert the liquid through the alternate flow path and to close off the ends of the primary flow path such that said primary path defining means serves as a closed dispenser housing during a dispensing operation; and to actuate said dispensing means to dispense a charge of liquid from the primary flow path into the receptacle, when the ends of the primary flow path are closed off.

6. In apparatus for dispensing into a series of receptacles a constant volume charge of liquid from a system in which it is desired that the liquid be in continuous circulation:

means defining a primary flow path through which the liquid normally flows, said means comprising the housing of a constant volume dispensing device;

dispensing means cooperating with said path defining means to form a constant volume dispensing device;

means defining an alternate flow path in parallel with the primary flow path;

valve means for selectively permitting flow of the liquid alternatively through the primary flow path and the alternate flow path, said valve means being normally in a condition such that the liquid flows through the primary flow path;

means for positioning successive receptacles to receive the dispensing liquid;

means for actuating said valve means from their normal condition such that the liquid is diverted through the alternate flow path and the ends of the primary flow path are closed off to constitute the primary flow path a closed dispenser housing during a dispensing operation, said actuating means being operable when a receptacle is positioned to receive the discharged liquid; and means for operating said dispensing means to dispense a charge of liquid from the primary flow path into the receptacle, when the ends of the primary flow path are closed off.

7. In apparatus for dispensing into a series of receptacles a constant volume charge of liquid from a system in which it is desired that the liquid be in continuous circulation:

means defining a primary flow path through which the liquid normally flows, said means comprising the housing of a constant volume dispensing device;

dispensing means cooperating with said path defining means to form a constant volume dispensing device;

means defining an alternate flow path in parallel with the primary flow path;

valve means for selectively permitting flow of the liquid alternatively through the primary flow path and the alternate flow path, said valve means being normally in a condition such that the liquid flows through the primary flow path;

means for positioning successive receptacles to receive the dispensed liquid;

means for sensing the presence of a receptacle properly positioned to receive the dispensed liquid;

means for actuating said valve means from their normal condition such that the liquid is diverted through the alternate flow path and the ends of the primary flow path are closed off to constitute the primary flow path a closed dispenser housing during a dispensing operation, said actuating means being operable when said sensing means detects the presence of a properly positioned receptacle; and means for operating said dispensing means to dispense a charge of liquid from the primary flow path into the receptacle, when the ends of the primary flow path are closed off.

8. In apparatus for dispensing into a series of receptacles a constant volume charge of liquid from a system in which it is desired that the liquid be in continuous circulation:

means defining a primary flow path through which the liquid normally flows, said means comprising the housing of a constant volume dispensing device;

means defining an alternate flow path in parallel with the primary flow path;

two solenoid-operated valves for selectively permitting flow of the liquid alternatively through the primary flow path and the alternate flow path, said valves interconnecting the primary and the alternate flow paths and being normally in a condition such that the liquid flows through the primary flow path;

a dispensing valve housed within said primary flow path, said dispensing valve being operable to dispense the liquid from the primary flow path when both the ends of the primary flow path are closed off and the pressure therein exceeds a predetermined amount;

pressure increasing means cooperable with the primary flow path to increase the pressure therein beyond a predetermined amount only when the ends thereof are closed off so that said dispensing valve is operable to dispense a charge of liquid from the primary flow path;

means for indexing successive receptacles to a proper position under said dispensing valve, said indexing means being operable only when the liquid is flowing through the primary flow path;

means for sensing the presence of a receptacle properly indexed to a position to receive the dispensed liquid;

means for actuating the solenoids of said solenoid-operated valves when said sensing means detects the presence of a properly positioned receptacle such that the valves are positioned to divert the liquid through the alternate flow path and to close off the ends of the primary flow path, said actuating means, when said sensing means does not detect the presence of a receptacle, positioning said solenoid-operated valves such that the liquid is diverted through the alternate flow path but the primary flow path is not closed off; and means for operating said pressure increasing means to dispense a charge of liquid from the primary flow path into the receptacle when the ends of a primary flow path are closed off.

9. In apparatus for dispensing into a series of receptacles a constant volume charge of liquid from a system in which it is desired that the liquid be in continuous circulation:

means defining a primary flow path through which the liquid normally flows, said means comprising the housing of a constant volume dispensing device;

means defining an alternate flow path in parallel with the primary flow path;

two solenoid-operated valves for selectively permitting flow of the liquid alternatively through the primary flow path and the alternate flow path, said valves interconnecting the primary and the alternate flow paths and being normally in a condition such that the liquid flows through the primary flow path;

a spring biased needle valve housed within said primary flow path, said needle valve being operable to dispense the liquid from the primary flow path when both the ends of the primary flow path are closed off and the pressure therein exceeds a predetermined amount;

a plunger movable into and out of the primary flow path to increase the pressure therein beyond a predetermined amount only when the ends thereof are closed off so that said needle valve is operable to dispense a charge of liquid from the primary flow path;

means for indexing successive receptacles to a proper position under said needle valve, said indexing means being operable only when the liquid is flowing through the primary flow path;

means for sensing the presence of a receptacle properly indexed to a position to receive the dispensed liquid;

means for actuating the solenoids of said solenoid-operated valves when said sensing means detect the presence of a properly positioned receptacle such that the valves are positioned to divert the liquid through the alternate flow path and to close off the ends of the primary flow path, said actuating means, when said sensing means does not detect the presence of a properly positioned receptacle, positioning said solenoid-operated valves such that the liquid is diverted through the alternate flow path but the primary flow path is not closed off; and cam controlled means for moving said plunger to dispense a charge of liquid from the primary flow path into the receptacle when the ends of a primary flow path are closed off.

References Cited by the Examiner

UNITED STATES PATENTS

| 842,517 | 1/07 | Bourne | 222—436 |
| 3,094,093 | 6/63 | Zimmerman | 222—319 XR |
| 3,104,030 | 9/63 | Howlett | 222—59 |

FOREIGN PATENTS

| 557,882 | 5/58 | Canada. |
| 527,005 | 6/31 | Germany. |
| 331,754 | 11/35 | Italy. |

LAVERNE D. GEIGER, *Primary Examiner.*